(12) United States Patent
Kim et al.

(10) Patent No.: US 10,082,697 B2
(45) Date of Patent: Sep. 25, 2018

(54) DISPLAY APPARATUS WITH BACKLIGHT AND REFLECTIVE SHEET HOLDER WITH CONCAVE PARTS

(71) Applicant: SAMSUNG ELECTRONICS CO., LTD., Suwon-si (KR)

(72) Inventors: Jong Bin Kim, Suwon-si (KR); Jeong Shan Na, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 15/139,607

(22) Filed: Apr. 27, 2016

(65) Prior Publication Data

US 2016/0313606 A1    Oct. 27, 2016

(30) Foreign Application Priority Data

Apr. 27, 2015  (KR) .................. 10-2015-0058788

(51) Int. Cl.
*G02F 1/1335* (2006.01)
*G02F 1/1345* (2006.01)
*G02F 1/1333* (2006.01)

(52) U.S. Cl.
CPC .. *G02F 1/133611* (2013.01); *G02F 1/133603* (2013.01); *G02F 1/133605* (2013.01);
(Continued)

(58) Field of Classification Search
CPC ........ G02F 2001/133308; G02F 2001/133317; G02F 1/133602; G02F 1/133603;
(Continued)

(56) References Cited

U.S. PATENT DOCUMENTS

2006/0114694 A1* 6/2006 Cho .................. G02B 6/0083
362/631
2007/0211494 A1* 9/2007 Ito .................. G02B 6/0091
362/632
(Continued)

FOREIGN PATENT DOCUMENTS

KR    1020060022006 A    3/2006

OTHER PUBLICATIONS

Communication dated Sep. 26, 2016 issued by the European Patent Office in counterpart European Patent Application No. 16166499.0.

*Primary Examiner* — Elmito Breval
*Assistant Examiner* — Michael Chiang
(74) *Attorney, Agent, or Firm* — Sughrue Mion, PLLC (57) ABSTRACT

A display apparatus that includes a display panel, a plurality of light sources disposed in upper and lower side directions and in left and right side directions at a rear side of the display panel while spaced apart from one another, a reflective sheet to reflect light generated from the plurality of light sources to the display panel, and a middle holder to support a periphery of the reflective sheet, wherein the middle holder includes a plurality of concave parts each provided at a position corresponding to each of the light sources that is positioned at an outer side among the plurality of the light sources. Most of the light incident from the light sources positioned at the outer side toward the middle holder is reflected while diffused by an inner surface of the concave part, and thus occurrence of a light portion and a dark portion at a periphery of a display panel can be reduced.

15 Claims, 5 Drawing Sheets

(52) U.S. Cl.
CPC .... *G02F 1/133608* (2013.01); *G02F 1/13452* (2013.01); *G02F 2001/133317* (2013.01); *G02F 2201/465* (2013.01)

(58) Field of Classification Search
CPC ......... G02F 1/133605; G02F 1/133606; G02F 1/133608; G02F 1/133611
See application file for complete search history.

(56) References Cited

U.S. PATENT DOCUMENTS

| | | | |
|---|---|---|---|
| 2010/0309406 A1* | 12/2010 | Kim | G02B 3/0006 349/61 |
| 2012/0069248 A1 | 3/2012 | Yokota | |
| 2012/0176814 A1* | 7/2012 | Chung | G02B 6/009 362/613 |
| 2012/0218475 A1* | 8/2012 | Matsumoto | G02F 1/133603 348/725 |
| 2014/0211121 A1 | 7/2014 | Cho et al. | |

* cited by examiner

FIG. 5

DISPLAY APPARATUS WITH BACKLIGHT AND REFLECTIVE SHEET HOLDER WITH CONCAVE PARTS

CROSS-REFERENCE TO RELATED APPLICATION

This application claims the benefit of the Korean Patent Application No. 2015-0058788, filed on Apr. 27, 2015, in the Korean Intellectual Property Office, the disclosure of which is incorporated herein by reference in its entirety.

BACKGROUND

1. Field

Apparatuses and methods consistent with exemplary embodiments relate to a display apparatus having a plurality of light sources provided at a rear side of a display panel, and a reflective sheet to reflect light generated from the plurality of light sources to the display panel.

Apparatuses and methods consistent with exemplary embodiments also relate to a display apparatus including a plurality of light sources provided behind a display panel and a reflective sheet to reflect light generated from the plurality of light sources to the display panel.

2. Description of the Related Art

In general, a display apparatus includes a display panel, on which images are displayed, and a backlight to supply light to the display panel.

One type of such a display apparatus is a direct-type display apparatus, which is provided with a plurality of light sources disposed in upper and lower side directions and left and right side directions at a rear of a display panel, and has a reflective sheet to reflect light generated from the plurality light sources to the display panel.

With such a display apparatus, light generated from the light sources that are positioned at outer edges of the display apparatus from among the plurality of light sources is reflected toward a front of the display panel by a sheet side portion inclinedly provided at a peripheral side of the reflective sheet. In this case, a large amount of light reaches a portion adjacent to the light source and then is reflected toward the front, and a small amount of light reaches a portion distant from the light source and then is reflected toward the front.

Therefore, at a periphery of the display panel, a light portion and a dark potion are generated. The light portion is illuminated by relatively more amount of light then the dark portion.

SUMMARY

Aspects of one or more exemplary embodiments may overcome the above disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a display apparatus including a display panel, a backlight disposed at a rear side of the display panel, a reflective sheet configured to reflect light generated from the backlight toward the display panel, a bottom chassis configured to accommodate the backlight, and a middle holder configured to support a peripheral side of the reflective sheet while coupled to the bottom chassis. The backlight includes a substrate and a plurality of light-emitting diodes disposed on the substrate. The middle holder includes a plurality of concave parts each concavely provided at a position corresponding to each light-emitting diode among the plurality of light-emitting diodes that are positioned at outer portions of the substrate.

In some exemplary embodiments, the display apparatus may further include wherein the reflective sheet include a sheet rear portion forming a rear surface of the reflective sheet, and a sheet side portion extending inclinedly outwardly toward a front of the display apparatus from an outer side end of the sheet rear portion, the middle holder comprises a bottom coupling part coupled to the bottom chassis, and a sheet holder part configured to support the reflective sheet while extending inclinedly toward an inner side of a rear from the bottom coupling part, wherein the plurality of concave parts are provided in the sheet holder part.

In some exemplary embodiments, each of the plurality of concave parts is formed in a shape of an arc.

Some exemplary embodiments of the display apparatus include wherein the plurality of concave parts is formed in a shape of an arc having a curvature centered with respect to each corresponding light-emitting diode.

In exemplary embodiments of the display apparatus, the middle holder is white.

Some exemplary embodiments of the display apparatus include wherein the bottom chassis includes a bottom rear part having a shape of a rectangular panel, four bottom inclination parts extending inclinedly outwardly towards a front of the display apparatus from four outer side ends of the bottom rear part, and a holder coupling part to which the middle holder is coupled while provided at a front side of the four bottom inclination parts, and the middle holder comprises four middle holders, each formed in a shape of a bar and coupled to another of the four holder coupling parts.

One or more exemplary embodiments include a display apparatus having a display panel, a pattern of a plurality of light sources configured to irradiate light around a periphery of a rear side of the display panel, a reflective sheet configured to reflect light generated from the plurality of light sources to the display panel, and a middle holder configured to support the reflective sheet. The middle holder comprises a plurality of concave parts, each of the plurality of concave parts provided at a position corresponding to light sources among the plurality of light sources that are positioned at outer portions of the pattern.

In some exemplary embodiments, the reflective sheet includes a sheet rear portion forming a rear surface of the reflective sheet, and a sheet side portion extending inclinedly outwardly towards a front of the display apparatus from the sheet rear portion, and the middle holder is further configured to support the sheet side portion.

Some exemplary embodiments of the display apparatus include wherein each of the plurality of concave parts is formed in a shape of an arc having a curvature centered with respect to each corresponding light source.

In some exemplary embodiments, the plurality of light sources comprise a light-emitting diode.

One or more exemplary embodiments include a displaying apparatus having a display panel, a backlight disposed to irradiate light towards a rear side of the display panel, the backlight comprising a plurality of light sources, a reflective sheet configured to reflect light emitted from the backlight towards the display panel, a bottom chassis configured to mount the backlight, and a middle holder configured to engage with the bottom chassis, the middle holder comprising a plurality of concave parts outside of outer portions of the plurality of light sources, each of the plurality of concave parts being respectively aligned with a corresponding light source of the plurality of light sources.

In some exemplary embodiments, the plurality of light sources are arranged in rows and columns.

Some exemplary embodiments of the display apparatus include wherein the middle holder and the bottom chassis further are configured to hold outer portions of the reflective sheet at an inclined angle relative to a central portion of the reflective sheet.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EXEMPLARY EMBODIMENTS

The following description refers to one or more exemplary embodiments and methods of accomplishing the same, examples of which are illustrated in the accompanying drawings to assist in a comprehensive understanding, wherein like reference numerals refer to like elements throughout. The detailed description includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Figure 1:
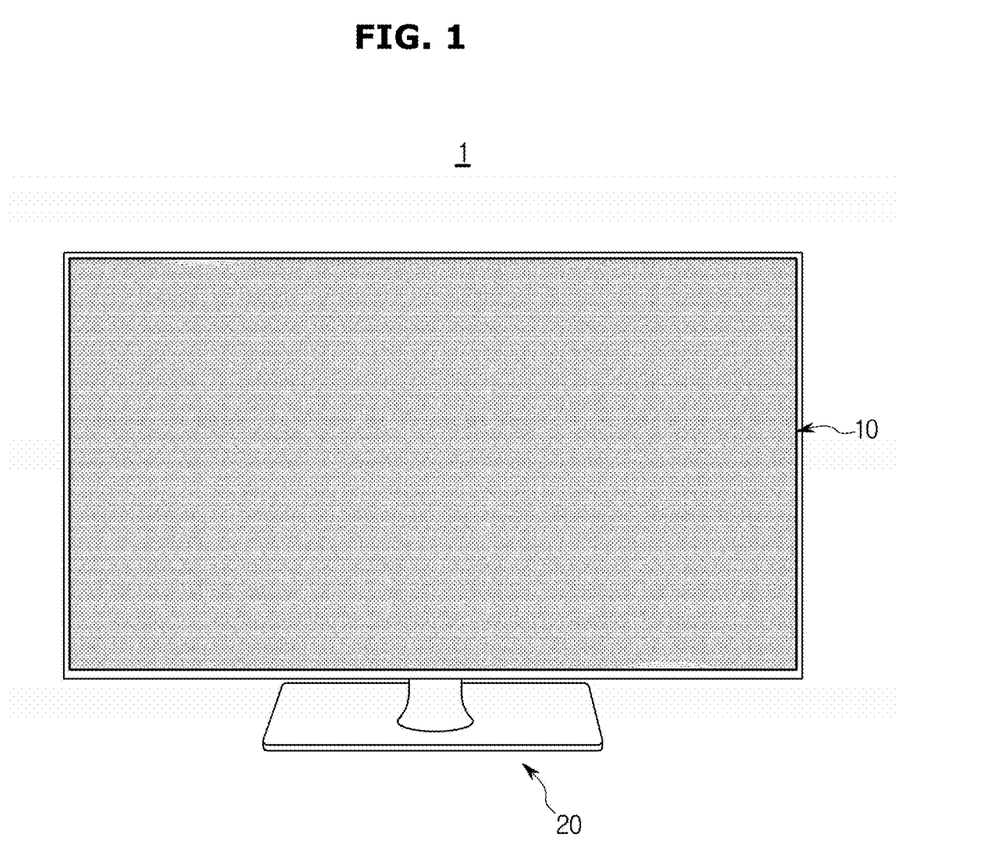
FIG. 1 illustrates a frontal view of a display apparatus according to an exemplary embodiment of the present disclosure.

As illustrated on FIG. 1, a display apparatus 1 according to an exemplary embodiment of the present disclosure includes a display unit 10 on which images are displayed, and a stand 20 configured to position or elevate the display unit 10 in a standing position on a horizontal surface.

Figure 2:
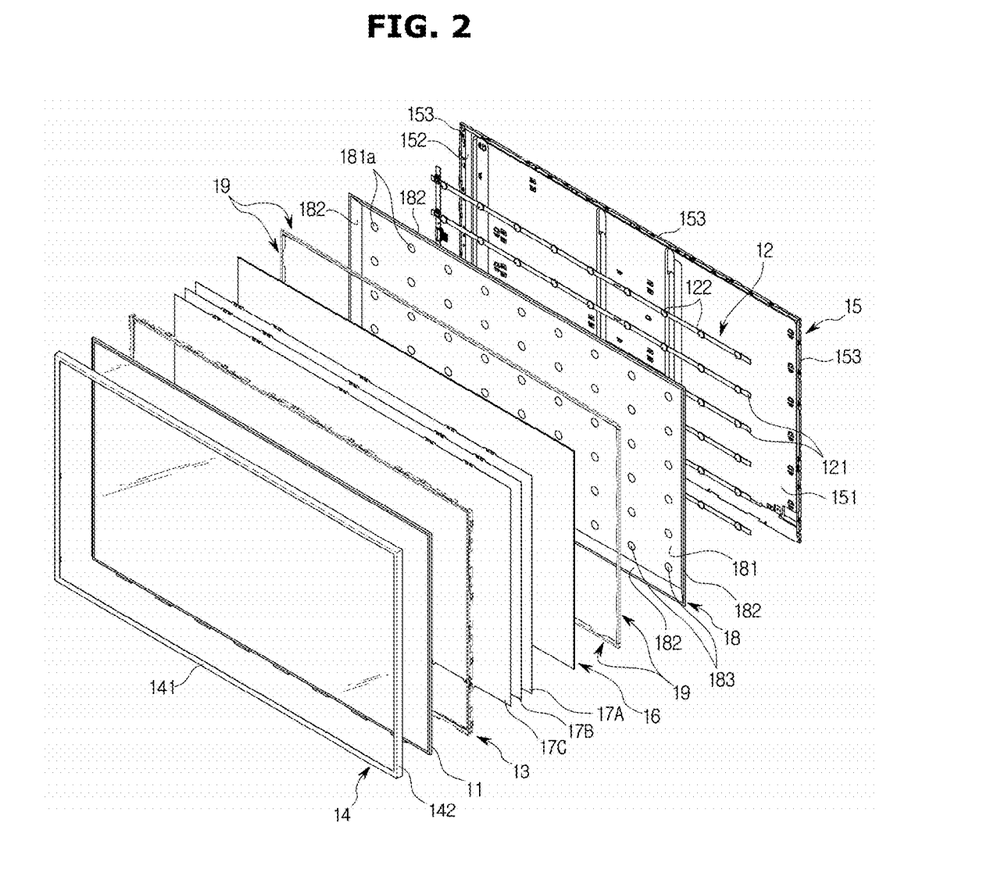
FIG. 2 illustrates an exploded perspective view of the display apparatus according to an exemplary embodiment of the present disclosure.
Figure 3:
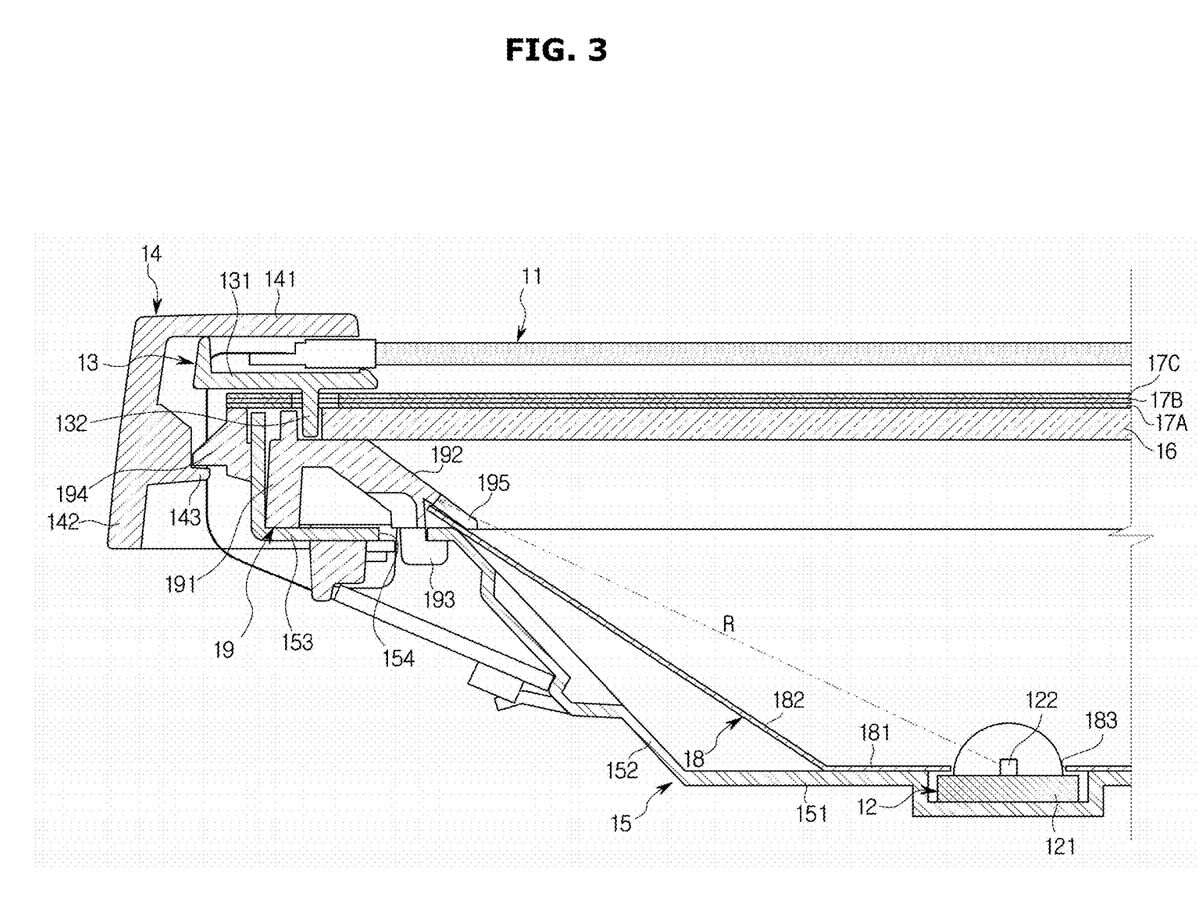
FIG. 3 illustrates a partial cross-sectional view of the display apparatus according to an exemplary embodiment of the present disclosure.

As illustrated on FIG. 2 and FIG. 3, the display unit 10 includes a display panel 11 forming a screen, a backlight 12 to supply light to the display panel 11 disposed at a rear of the display panel 11 and spaced apart. A middle mold 13 supports the display panel 11. A top chassis 14 is provided such that the display panel 11 may maintain a state of being supported at a front side of the middle mold 13, and a bottom chassis 15 is provided such that the backlight 12 is disposed at a rear side of the middle mold 13 while the bottom chassis 15 is coupled to the middle mold 13.

The display panel 11 is structured by use of a liquid crystal panel being formed when liquid crystal is sealed in between two glass panels each provided with an electrode.

The backlight 12 includes substrates 121, and a plurality of light-emitting diodes 122 each installed on the substrates 121 and each provided to function as a light source. The substrates 121 in the present embodiment include a plurality of substrates 121 formed in the shape of a rectangular bar and vertically disposed while being spaced apart from one another, and the light-emitting diodes 122 are installed in a plurality of units thereof at the each of the plurality of substrates 121 while being spaced apart from one another. Therefore, the light-emitting diodes 122 are provided in a state in which the light-emitting diodes 122 are patterned upwardly and downwardly as well as towards left and right sides at the rear side of the display panel 11 while being spaced apart from one another. In exemplary embodiments, the light-emitting diodes are arranged in a pattern of rows and columns. The light-emitting diodes may be arranged in a rectangular pattern.

The middle mold 13 includes a panel settling part 131 provided at a front side of the middle mold 13 and on which the display panel 11 is settled and supported, and sheet supporting parts 132 protruded toward a rear side of the display apparatus from the panel settling part 131 as to support outer sides of optical sheets 17A, 17B, and 17C, which are described later.

The top chassis 14 includes a top front surface part 141 to support a periphery of the display panel 11, and a top side part 142 coupled to a middle holder 19, which is to be described later. In the present embodiment, the top chassis 14 is provided to function as a case forming an exterior appearance of the display part 10.

The bottom chassis 15 includes a bottom rear part 151 to support a rear surface of the backlight 12, the bottom rear part 151 being formed substantially in the shape of a rectangular panel. Four bottom side parts 152 extend inclinedly and outwardly from the four outer side edges of the bottom rear part 151 toward the front of the display apparatus. A holder coupling part 153 is provided at a front side of each of the four bottom side units 152, the holder coupling part 153 being configured to couple to the middle holder 19, which is described later. A diffusion member 16, configured to diffuse the light supplied from the backlight 12, and the optical sheets 17A, 17B, and 17C, configured to improve optical characteristics of the light delivered by the diffusion member 16, are included between the display panel 11 and the backlight 12. The outer edges of the diffusion member 16 and the optical sheets 17A, 17B, and 17C in the present embodiment are supported when positioned in between the middle mold 13 and the middle holder 19.

The diffusion member 16 is formed in the shape of a rectangular panel to correspond to the display panel 11. The diffusion member 16 is formed with white, semi-transparent material and is configured such that the light supplied from the backlight 12 may be diffusively penetrated.

The optical sheets 17A, 17B, and 17C include a diffusing sheet 17A to diffuse the light delivered by the diffusion member 16, a prism sheet 17B to collect the light delivered from the diffusing sheet 17A through refraction, and a protective sheet 17C to protect the prism sheet 17B.

An inside of the bottom chassis 15 is provided with a reflective sheet 18 disposed thereto such that the light generated from the light-emitting diodes 122 may be reflected to the display panel 11 at a front, and the bottom chassis 15 is provided with the middle holder 19 coupled thereto as the middle holder 19 is provided to maintain the reflective sheet 18 in a state of being installed at an inside of the bottom chassis 15.

The reflective sheet 18 includes a sheet rear part 181 to form a rear side of the reflective sheet 18 while formed in the shape of a rectangle, and four sheet side parts 182 extending inclinedly outwardly from the four outer side edges of the sheet rear part 181 toward a front of the display apparatus. The sheet rear part 181 is provided with a penetration hole 183 at a position corresponding to the each of the light-emitting diodes 122 so that the light-emitting diodes 122 may penetrate the reflective sheet 18 and protrude towards a front side.

The middle holder 19 is white, so to reflect light while diffusing the light. Four middle holders 19 are each coupled to each of the four holder coupling parts 153 of the bottom chassis 15 while formed substantially in the shape of a rectangular bar when seen from a front side. Each middle holder 19 includes a bottom coupling part 191 coupled to the holder coupling part 153, and a sheet holder part 192 to support a front side end portion of the sheet side part 182 while extending inclinedly toward the rear of the display panel. In addition, the bottom coupling part 191 of the middle holder is provided with a first coupling hook 193 protruded toward a rear side, and a second coupling hook 194 protruding towards a side of the display apparatus. The holder coupling part 153 is provided with a coupling hole 154 at which the first coupling hook 193 is penetratively hooked, and the top chassis 14 includes a hooking bump 143 with which the second coupling hook 194 is hooked while protruded from an inner surface of the top side part 142.

In exemplary embodiments, the middle holder 19 and the middle mold 13 support a periphery of the diffusion member 16.

Therefore, after the reflective sheet 18 is disposed inside of the display apparatus between the display panel 11 and the bottom chassis 15, the middle holder 19 is coupled to the holder coupling part 153 by the first coupling hook 193 and the coupling hole 154. The front side end portion of the sheet side part 182 is inserted between the bottom side part 152 and the sheet holder part 192, and thus the installation of the reflective sheet 18 is completed.

Figure 4:
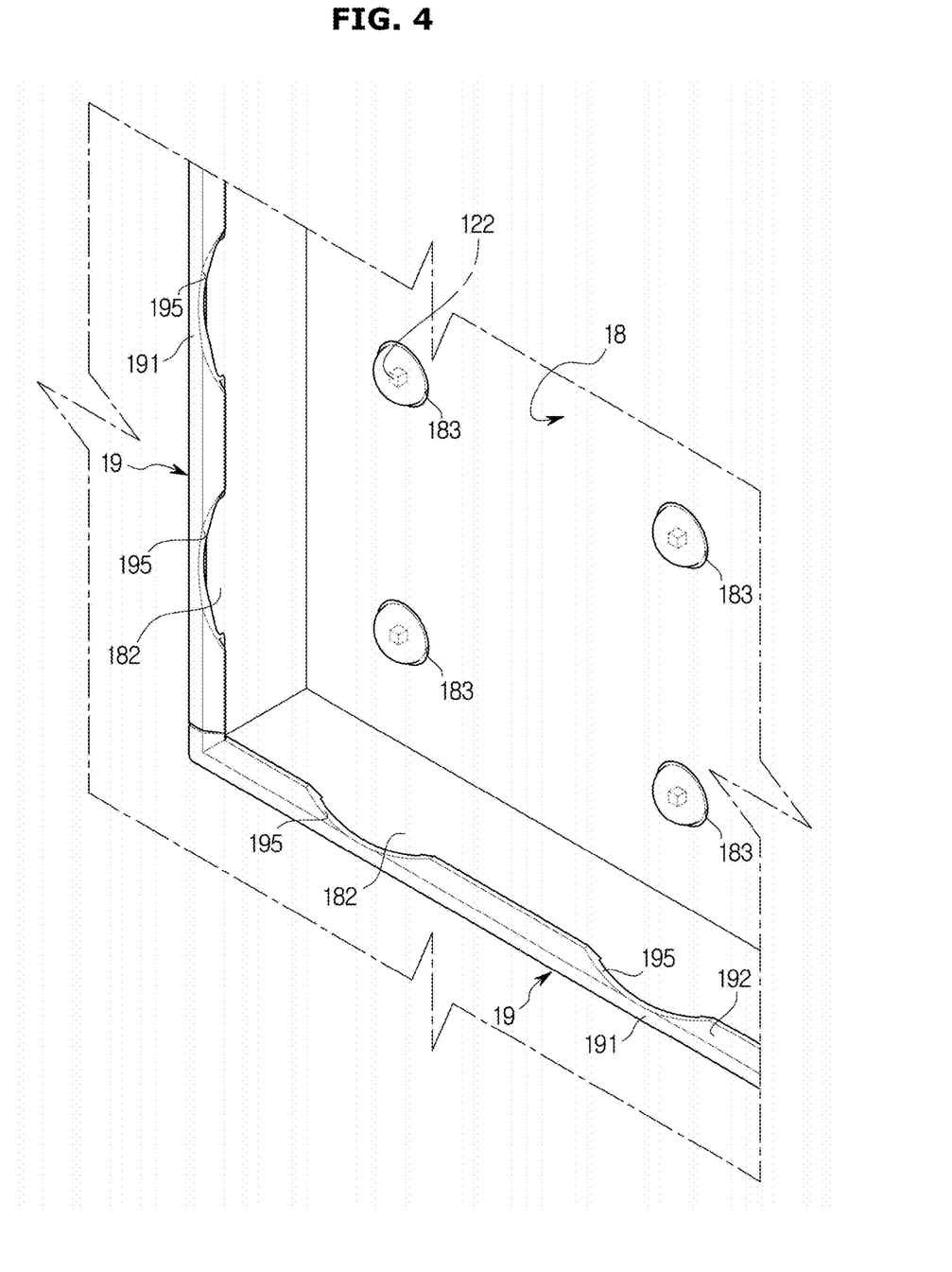
FIG. 4 illustrates a partial perspective view showing a coupling state of a middle holder of the display apparatus according to an exemplary embodiment of the present disclosure.

In addition, as illustrated on FIG. 4, the middle holders 19 include concave parts 195 each concavely provided at a position corresponding to each of the light-emitting diodes 122 that are positioned at outer positions of the pattern of light-emitting diodes 122. As illustrated on FIG. 5, the each concave part 195 is formed in the shape of an arc having the corresponding light-emitting diode 122 aligned as a center of the curvature R.

Figure 5:
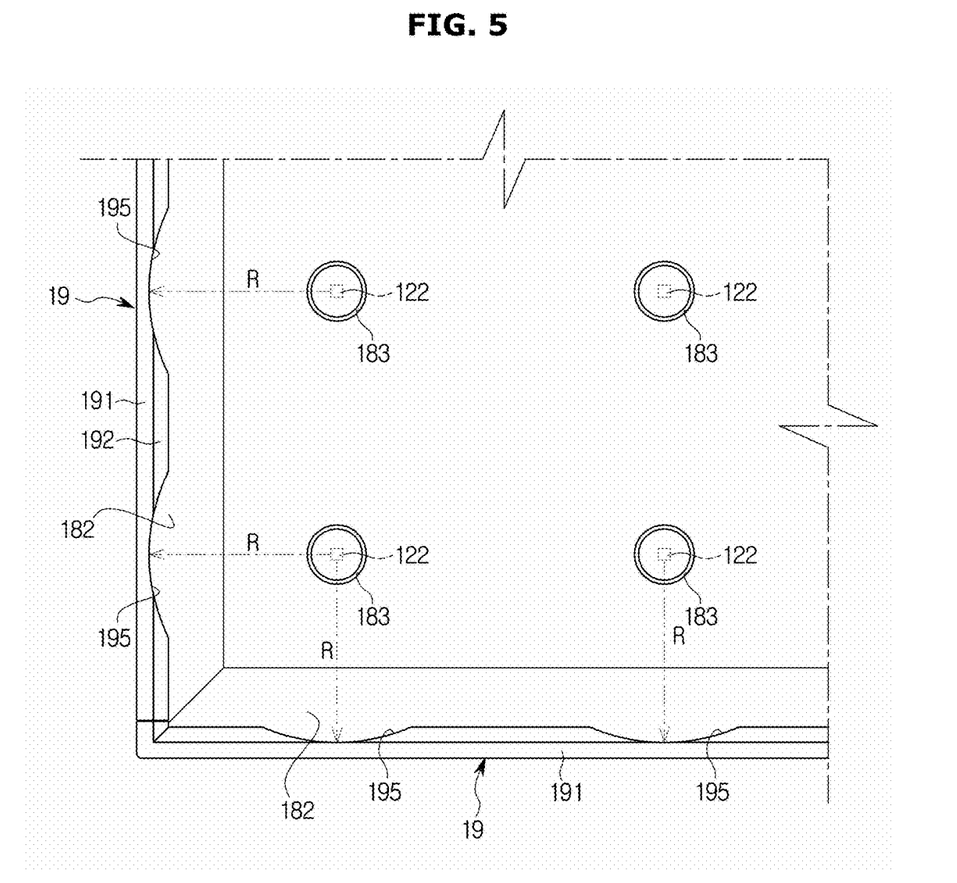
FIG. 5 illustrates a frontal view showing the middle holder and a light-emitting diode of the display apparatus according to an exemplary embodiment of the present disclosure.

With the structure above, most of the light radiated toward the middle holder 19 from the light-emitting diode 122 corresponding to the each concave part 195 is incident at an inner surface of the concave part 195 at a substantially identical distance. As the amount of the light is provided to be inversely proportional to the square of the distance, a uniform amount of light is incident at the inner surface of the concave part 195 and then is reflected after being diffused. Therefore, the occurrence of the light portion and the dark portion at a periphery of the display panel 11 is reduced by use of the concave parts 195.

The concave part 195 in an exemplary embodiment is provided such that uniform light is incident at the inner surface of the concave part 195 while formed in the shape of an arc, but is not limited hereto, and the concave part may be formed in a variety of arc shapes, such as the shape of an elliptical arc, or the concave part may be formed in the shape of a polygon.

The four middle holders 19 formed in the shape of a rectangular bar are provided in the present embodiment, but are not limited hereto, and the middle holder may be formed in the shape of a rectangular frame.

In addition, the middle holder 19 in the present embodiment includes the bottom coupling part 191 and the sheet holder part 192, and the concave part 195 is provided at the sheet holder part 192, but are not limited hereto, and in a case that the middle holder is provided with a structure corresponding to only the bottom coupling part 191, the concave part may be provided in the bottom coupling part 191.

In addition, the light-emitting diode 122 is used as a light source to generate light in the exemplary embodiment, but is not limited hereto, and other various light sources, such as a cold cathode fluorescent (CCFL), quantum dot, or light-emitting transistor , may be used.

As described above, a concave part is provided at a middle holder 19 to correspond to each of light-emitting diodes that is at an outer side among the light-emitting diodes, and thus most of the light incident from the light-emitting diodes at the outer side toward the middle holder is reflected and diffused by an inner surface of the concave part, and the occurrence of a light portion and a dark portion at a periphery of a display panel can be reduced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus, comprising:
a display panel;
a backlight disposed at a rear side of the display panel;
a reflective sheet configured to reflect light generated by the backlight toward the display panel;
a bottom chassis configured to accommodate the backlight; and
a middle holder coupled to the bottom chassis and configured to support a peripheral side of the reflective sheet,
wherein the backlight comprises a substrate and a plurality of light-emitting diodes disposed on the substrate,
wherein the middle holder comprises:
a plurality of concave parts each provided at a position corresponding to a light-emitting diode positioned at an outer portion of the substrate from among the plurality of light-emitting diodes,
a bottom coupling part coupled to the bottom chassis; and
a reflective sheet holder part extending inclinedly toward the rear side of the display panel from the bottom coupling part and configured to support the reflective sheet.

2. The display apparatus of claim 1, wherein the reflective sheet comprises:
a sheet rear portion forming a rear surface of the reflective sheet; and
a sheet side portion extending inclinedly outwardly towards a front of the display apparatus from an outer side end of the sheet rear portion, and wherein the plurality of concave parts of the middle holder are provided in the reflective sheet holder part of the middle holder.

3. The display apparatus of claim 1, wherein each of the plurality of concave parts is formed in a shape of an arc.

4. The display apparatus of claim 3, wherein each of the plurality of concave parts is formed in a shape of an arc having a curvature centered with respect to each corresponding light-emitting diode.

5. The display apparatus of claim 1, wherein the middle holder is white.

6. The display apparatus of claim 1, wherein the bottom chassis comprises:
a bottom rear part having a shape of a rectangular panel;
four bottom inclination parts extending inclinedly outwardly towards a front of the display apparatus from four outer side ends of the bottom rear part, and
a holder coupling part to which the middle holder is coupled provided at a front side of the four bottom inclination parts; and
wherein the middle holder further comprises four middle holders, each formed in a shape of a bar and coupled to another of the four holder coupling parts.

7. The display apparatus of claim 1, wherein the bottom chassis comprises:
a holder coupling part to which the middle holder is coupled, the holder coupling part comprising a coupling hole, and
wherein the middle holder further comprises a first coupling hook protruding toward the rear side of the display panel, the first coupling hook being penetratively hooked with the coupling hole.

8. The display apparatus of claim 7 further comprising a top chassis, the top chassis comprising a hooking bump,
wherein the middle holder further comprises a second coupling hook protruding towards a side of the display panel, the second coupling hook being hooked with the hooking bump.

9. A display apparatus, comprising:
a display panel;
a pattern of a plurality of light sources configured to irradiate light around a periphery of a rear side of the display panel;
a reflective sheet configured to reflect light generated from the pattern of the plurality of light sources to the display panel;
a bottom chassis configured to accommodate the pattern of the plurality of light sources; and
a middle holder configured to support the reflective sheet, wherein the middle holder comprises:
a plurality of concave parts, each of the plurality of concave parts provided at a position corresponding to a light source positioned at outer portions of the pattern of the plurality of light sources,
a bottom coupling part coupled to the bottom chassis; and
a reflective sheet holder part extending inclinedly toward the rear side of the display panel from the bottom coupling part and configured to support the reflective sheet.

10. The display apparatus of claim 9, wherein the reflective sheet comprises:
a sheet rear portion forming a rear surface of the reflective sheet; and
a sheet side portion extending inclinedly outwardly towards a front of the display apparatus from the sheet rear portion, and
the middle holder is further configured to support the sheet side portion.

11. The display apparatus of claim 9, wherein each of the plurality of concave parts is formed in a shape of an arc having a curvature centered with respect to each corresponding light source.

12. The display apparatus of claim 9, wherein the plurality of light sources comprises light-emitting diodes.

13. A display apparatus, comprising:
a display panel;
a backlight configured to irradiate light towards a rear side of the display panel, the backlight comprising a plurality of light sources;
a reflective sheet configured to reflect light emitted from the backlight towards the display panel;
a bottom chassis configured to mount the backlight; and
a middle holder configured to engage with the bottom chassis, the middle holder comprising:
a plurality of concave parts disposed outside of outer portions of the plurality of light sources, each of the plurality of concave parts being respectively aligned with a corresponding light source of the plurality of light sources;
a bottom coupling part coupled to the bottom chassis; and
a reflective sheet holder part extending inclinedly toward the rear side of the display panel from the bottom coupling part and configured to support the reflective sheet.

14. The display apparatus of claim 13, wherein the plurality of light sources are arranged in rows and columns.

15. The display apparatus of claim 13, wherein the middle holder and the bottom chassis are further configured to hold outer portions of the reflective sheet at an inclined angle relative to a central portion of the reflective sheet.

* * * * *